(12) United States Patent
Jin

(10) Patent No.: US 6,457,230 B1
(45) Date of Patent: Oct. 1, 2002

(54) AUTOMATIC REAR COMBINATION LAMP REMOVAL SYSTEM

(75) Inventor: Cheol-Min Jin, Seoul (KR)

(73) Assignee: Hyundai Motor Company, Seoul (KR)

( * ) Notice: Subject to any disclaimer, the term of this patent is extended or adjusted under 35 U.S.C. 154(b) by 0 days.

(21) Appl. No.: 09/569,108

(22) Filed: May 8, 2000

(30) Foreign Application Priority Data

Nov. 5, 1999 (KR) .............................................. 99-48810

(51) Int. Cl.⁷ ................................................ B23P 19/00
(52) U.S. Cl. .............................. 29/762; 29/729; 29/760; 29/426.1; 414/736; 414/737; 901/30
(58) Field of Search ........................... 29/762, 729, 832, 29/430, 426.1, 426.2, 759, 760, DIG. 44; 414/736, 737; 901/30, 40; 294/119.1, 88, 902, 64.1; 269/266; 228/264

(56) References Cited

U.S. PATENT DOCUMENTS

| | | | | |
|---|---|---|---|---|
| 4,762,030 A | * | 8/1988 | Nguyen | 81/55 |
| 4,901,431 A | * | 2/1990 | Gast | 29/707 |
| 5,151,570 A | * | 9/1992 | Sakurai | 219/86.25 |
| 5,380,978 A | * | 1/1995 | Pryor | 219/121.64 |
| 5,878,952 A | * | 3/1999 | Powell | 239/1 |
| 6,039,375 A | * | 3/2000 | Bauman | 294/119.1 |
| 6,047,472 A | * | 4/2000 | Koch et al. | 29/888.01 |
| 6,230,077 B1 | * | 5/2001 | Choi | 700/245 |

* cited by examiner

*Primary Examiner*—Peter Vo
*Assistant Examiner*—Minh Trinh
(74) *Attorney, Agent, or Firm*—Christie, Parker & Hale, LLP

(57) ABSTRACT

An automatic rear combination lamp removal system includes a base, a plurality of sliding blocks slidably mounted on the base for moving in four ways on the base, a plurality of fastener removers mounted on the sliding blocks for removing nuts fixing rear combination lamps to a vehicle, and a plurality of lamp holders pivotally mounted to the fastener removers for holding the rear combination lamps.

6 Claims, 5 Drawing Sheets

AUTOMATIC REAR COMBINATION LAMP REMOVAL SYSTEM

BACKGROUND OF THE INVENTION (a) Field of the Invention

The present invention relates to a rear combination lamp removal system for automatically removing rear combination lamps mounted to each side of a rear part of a vehicle.

(b) Description of the Related Art

Typically, a rear combination lamp of a vehicle incorporates a reflector, a lens, and a plurality of lamp bulbs for a tail lamp, a stop lamp, a signal lamp, a back-up lamp and the like, in a united fashion.

Conventionally, laborers strip this kind of rear combination lamp from vehicles, particularly from scrap vehicles. With large disassembly operations, many laborers and a great deal of time is required, and the rear combination tail lamps, which are reusable, can be broken.

SUMMARY OF THE INVENTION

The present invention has been made in an effort to solve the above problems of the prior art.

It is an object of the present invention to provide an automatic rear combination lamp removal system capable of reducing labor, operation time and parts breakage, resulting in a reduction of combination lamp removal costs.

To achieve the above object, an automatic rear combination lamp removal system comprises a base, a plurality of sliding blocks slidably mounted so they can move four ways on the base, a plurality of fastener removers mounted on the sliding blocks for removing nuts fixing the rear combination lamps to a vehicle, and a plurality of lamp holders pivotally mounted to the fastener removers for holding the rear combination lamps.

BRIEF DESCRIPTION OF THE DRAWINGS

The accompanying drawings, which are incorporated in and constitute a part of the specification, illustrate an embodiment of the invention, and, together with the description, serve to explain the principles of the invention:

FIG. 4b is a top plane view showing operation of sockets of the fastener removers of FIG. 4a.

DETAILED DESCRIPTION OF THE PREFERRED EMBODIMENTS

A preferred embodiment of the present invention will be described hereinafter with reference to the accompanying drawings.

Figure 1:
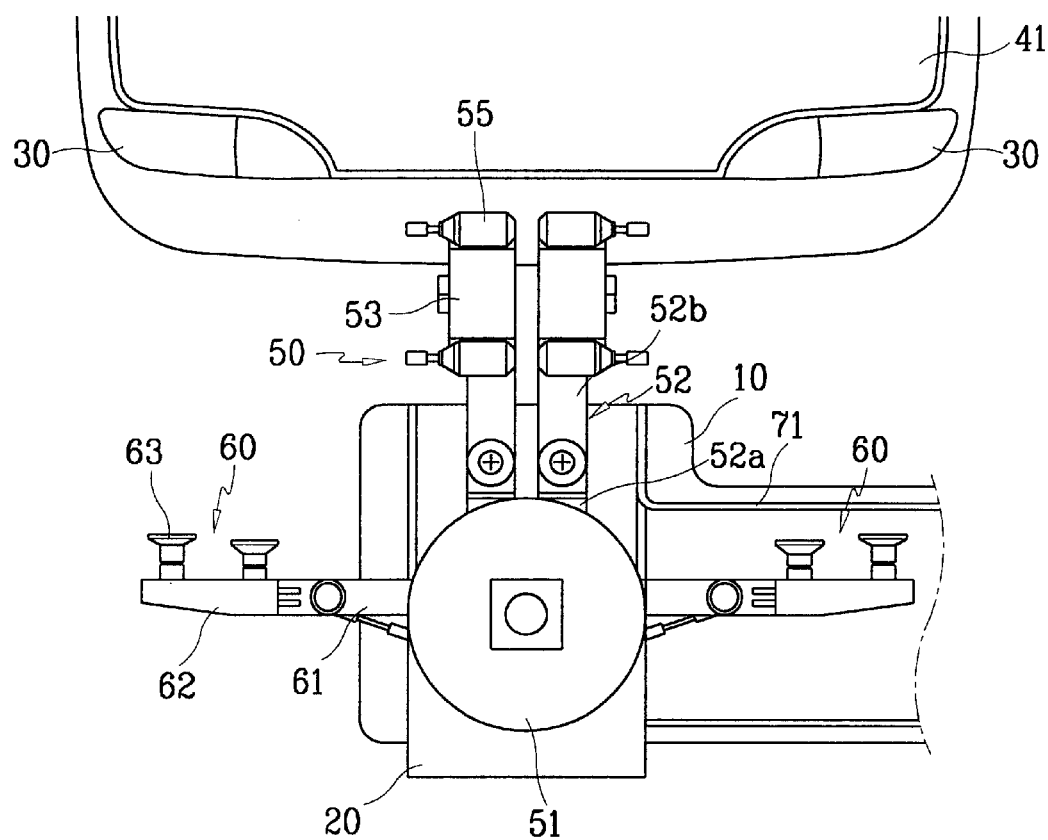
FIG. 1 is a top plane view showing an automatic rear combination lamp removal system according to a preferred embodiment of the present invention.
Figure 2:
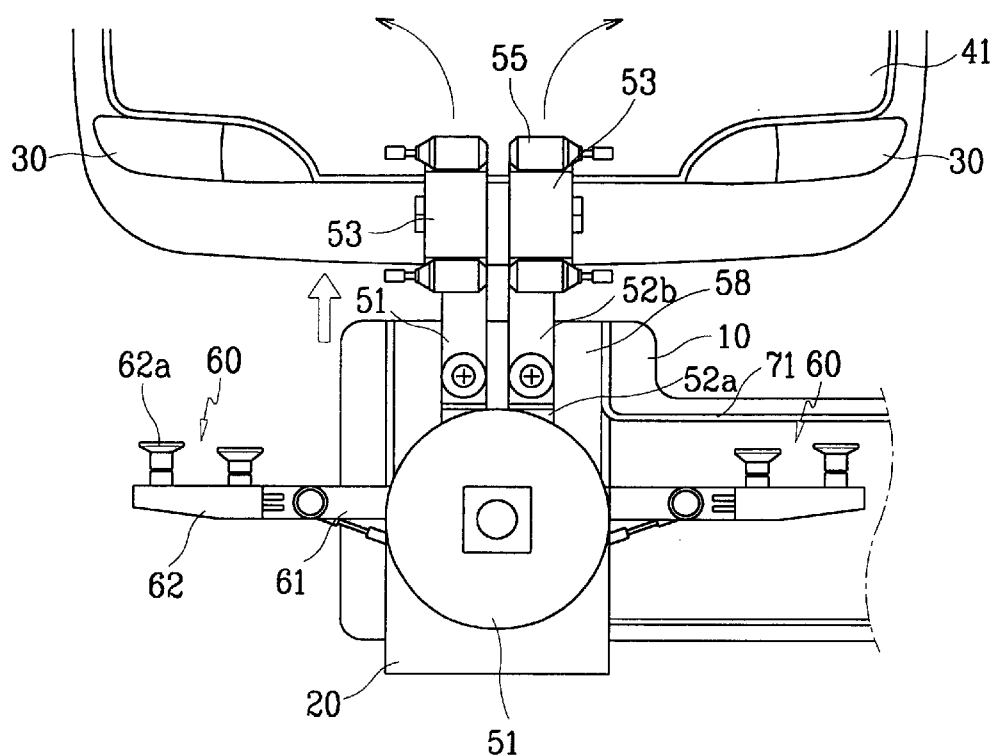
FIG. 2 is a top plane view showing the automatic rear combination lamp removal system of FIG. 1 while the system accesses an objective vehicle.
Figure 3:
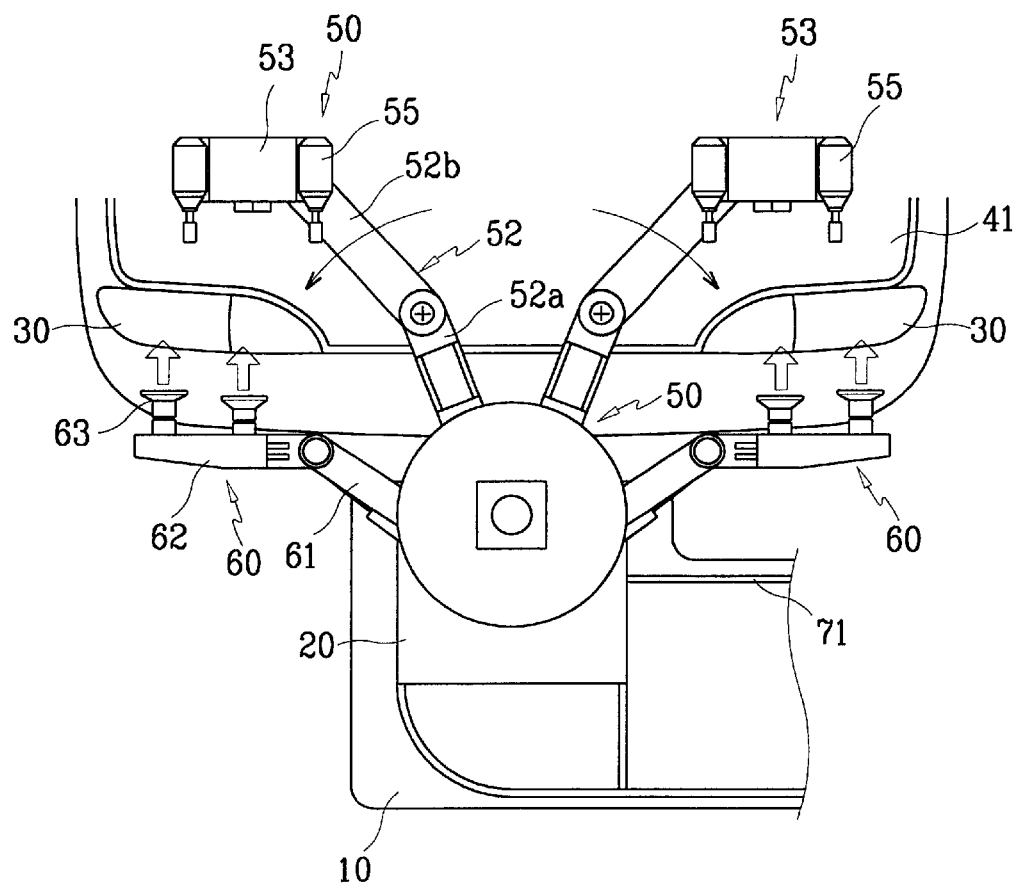
FIG. 3 is a top plane view showing the automatic rear combination lamp removal system of FIG. 1 while the system deploys into a trunk of the vehicle.
Figure 4A:
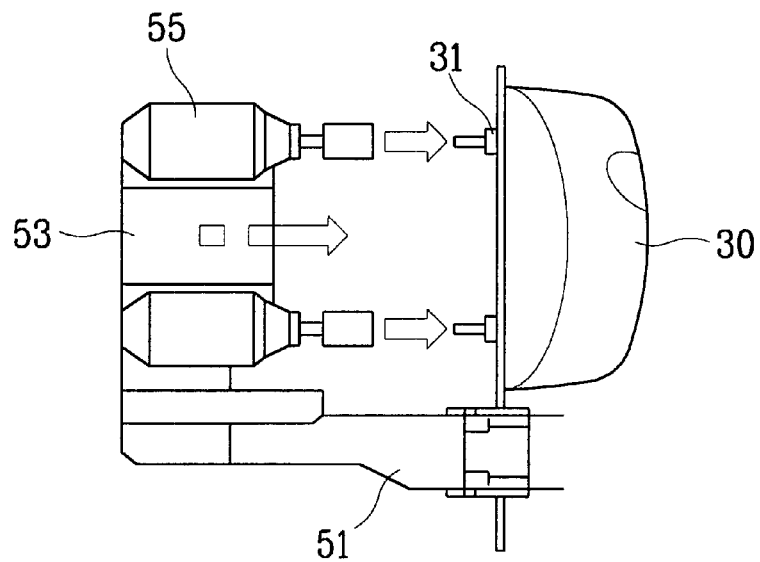
FIG. 4a is a partially enlarged top plane view showing operation of a fastener remover of the automatic rear combination lamp removal system of FIG. 1.
Figure 4B:
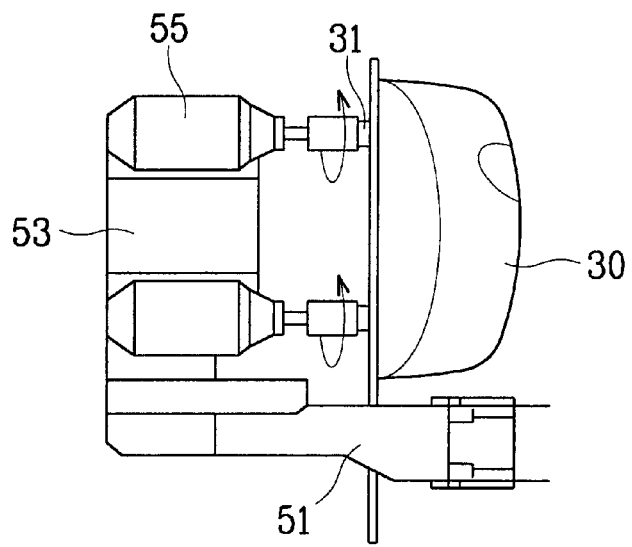
Figure 5:
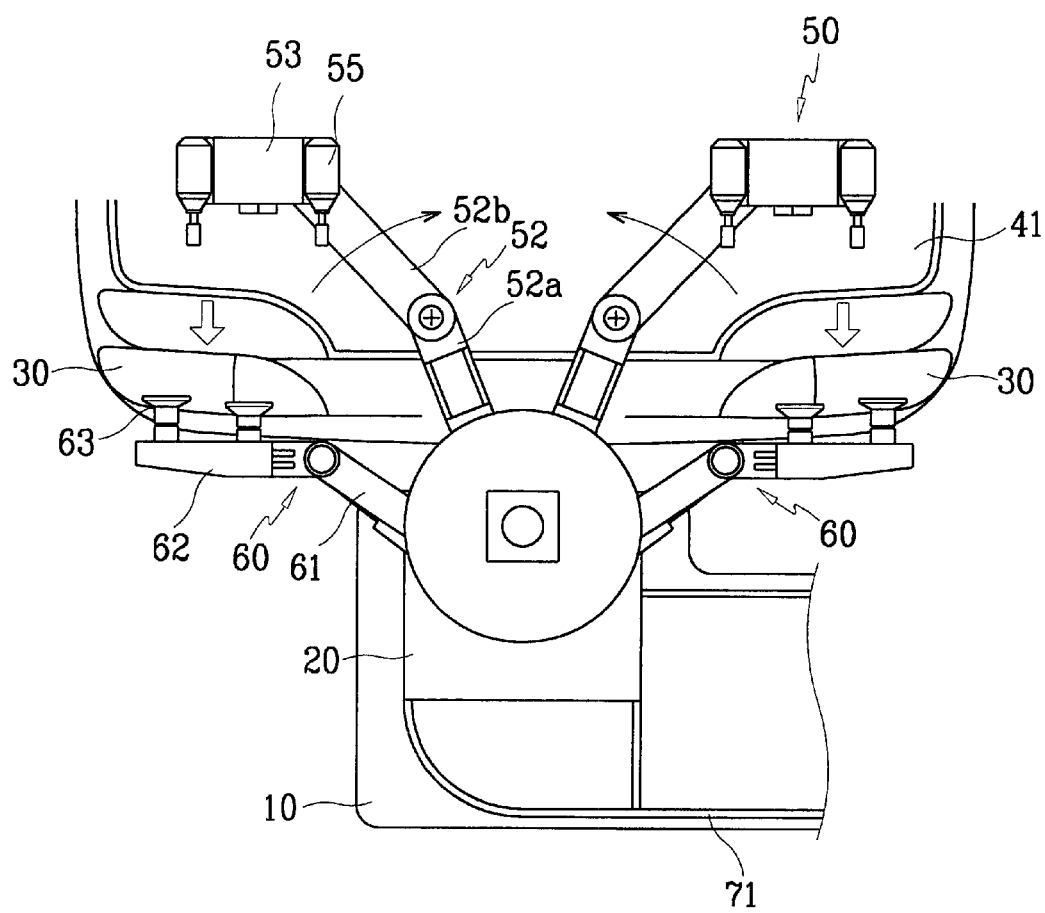
FIG. 5 is a top plane view showing the automatic rear combination lamp removal system of FIG. 1 while the system retracts after nuts are unscrewed by the fastener removers.

FIG. 1 is a top plane view showing an automatic rear combination lamp removal system according to a preferred embodiment of the present invention.

As shown in FIG. 1, the automatic rear combination lamp removal system according to a preferred embodiment of the present invention comprises a base 10, a plurality of sliding blocks 20 mounted on the base 10, nut remover units 50 mounted on the sliding blocks 20 for removing nuts which fix the combination lamps to the vehicle bodies, and a plurality of combination lamp holders 60 mounted to the nut remover units 50 for holding the rear combination lamps so as not to drop them. The base 10 is provided with guide rails 71 that are formed in longitudinal and parallel directions with relation to the vehicle body such that the sliding blocks 20 move in front, rear, left, and right directions along the guide rails 71. The sliding blocks 20 are operated by actuators (not shown) provided in the base 10.

The nut remover units 50 comprise remover bodies 51 formed in a drum shape, a pair of robot arms 52 mounted to each remover body 51, each robot arm including a first arm segment 52a pivotally connected to the remover body 51 on a drum axis of the remover body 51, the first arm segment 52a being able to expand in its longitudinal direction, a second arm segment 52b pivotally connected to the free end of the first arm segment 52a, and a loosener 53 rotatably mounted on the free end of the second arm segment 52b. The loosener 53 is provided with two wrenches 55 for fitting to and unscrewing the rear combination lamp retaining nuts. The wrench 55 is an air pressure socket wrench operated by air pressure. Commonly, a rear combination lamp 30 is mounted to each side of a rear part of a vehicle body, and each rear combination lamp 30 is fixed at two points by nuts such that it is preferred to provide at least two air pressure socket wrenches on each loosener 53.

Each lamp holder 60 comprises a pair of arms 61 pivotally connected to opposite sides of the remover body 51, and a suction device 62 pivotally connected to a free end of each arm 61, the suction device 62 being provided with a pair of suction cups 63 that are affixed to or released from the rear combination lamp by a supply or release of suction.

The first and second arm segments 51a and 51b, the looseners 53 of the nut removers 50, and the arms 61 and suction devices 62 of the lamp holder 60 are actuated by corresponding actuators (not shown) on the basis of signals from a controller (not shown) provided on the sliding block 20.

The operation of the automatic rear combination lamp removal system having the above structure will be described hereinafter with reference to FIG. 2 to FIG. 5.

As described above, the rear combination lamp removal system can be provided with a plurality of rear combination lamp removal units on the base 10 for large disassembly operations, but the operation of just one unit will now be explained because every unit has the same configuration.

Once an objective vehicle is in place and the trunk lid is opened, the sliding block 20 moves along the guide rail 71 in a direction parallel to the rear of the vehicle, at the speed of 500 mm/min, until it takes its correct position at the center of the width of the vehicle. The sliding block 20 then moves toward the vehicle at the speed of 300 mm/min such that the looseners 53 progress into the trunk of the vehicle.

During the movement of the sliding block toward the vehicle, the lamp holders 60 contact the rear combination lamps 30 and the suction members 63 of the rear combination lamps 30 affix to the rear combination lamps 30 by way of a supplied vacuum. Subsequently, the robot arms 52 extend and are deployed in such a way that both the first and second arm segments 52a and 52b are rotated outward to a predetermined angle, and the looseners 53 rotate on the end of the second arm segments 52b such that the wrenches 55 face a rear inner wall of the trunk. Then, the first arm segments 52a shorten a predetermined distance such that the 4 wrenches 55 hold the nuts that fix the rear combination lamps 30 to the vehicle body and unscrews them at the same time (see FIGS. 4a and 4b). It is preferred that the wrenches 55 rotate at the speed of 250 rpm in a counter-clockwise direction such that the nuts 31 are unscrewed in 15 seconds.

After the nuts are unscrewed, the robot arms 52 rotate toward each other, are withdrawn, and the sliding block 20 retreats at the speed of 300 mm/min to the pre-deployment position, while the lamp holders 60 hold the rear combination lamps 30 with the suction devices 62.

During the retraction of the sliding block 20, bulb connectors and wires connecting the rear combination lamps 30 to the vehicle body are removed from the rear combination lamps 30 by the retraction force of the sliding block 20. The removed rear combination lamps 30 are stored in a collecting box.

As described above, the automatic rear combination lamp 30 removal system according to a preferred embodiment of the present invention automatically removes rear combination lamps 30 from vehicles and allows large disassembly operations to occur in such a way that removal costs and manual labor time is reduced, resulting in an increased operational efficiency.

Furthermore, the automatic removal system minimizes the breakage of rear combination lamps 30 so as to contribute to the resource recycle policy.

While this invention has been described in connection with what is presently considered to be the most practical and preferred embodiment, it is to be understood that the invention is not limited to the disclosed embodiments, but, on the contrary, is intended to cover various modifications and equivalent arrangements included within the spirit and scope of the appended claims.

What is claimed is:

1. An automatic rear combination lamp removal system comprising:
    a base;
    a plurality of sliding blocks slidably mounted on the base for moving in four ways on the base;
    a plurality of fastener remover units mounted on the sliding blocks for removing nuts fixing rear combination lamps to a vehicle, wherein at least one of the plurality of fastener remover units comprises,
        a drum shaped remover body,
        a pair of robot arms pivotally connected to the remover body for deploying into a trunk of the vehicle, and
        a pair of looseners, one rotatably mounted on a free end of each of the robot arms, for removing nuts; and
    a plurality of lamp holders pivotally mounted to the fastener remover units for holding the rear combination lamps.

2. The automatic rear combination lamp removal system of claim 1 wherein at least one of the pair of looseners comprises a plurality of wrenches for unscrewing fasteners.

3. An automatic rear combination lamp removal system comprising:
    a base;
    a plurality of sliding blocks slidably mounted on the base for moving four ways on the base;
    a plurality of fastener remover units mounted on the sliding blocks for removing nuts fixing rear combination lamps to a vehicle; and
    a plurality of lamp holders pivotally mounted to the fastener remover units for holding the rear combination lamps, wherein at least one of the plurality of lamp holders comprises,
        a pair of arms pivotally connected to the remover body, and
        a pair of suction devices pivotally connected to the free end of each armcfor holding the rear combination lamp.

4. An automatic rear combination lamp removal system of claim 3 wherein at least one of the pair of suction devices comprises a plurality of suction cups that affix to the rear combination lamp.

5. An automatic rear combination lamp removal system comprising:
    a base;
    a plurality of sliding blocks slidably mounted on the base for moving four ways on the base;
    a plurality of fastener remover units mounted on the sliding blocks for removing nuts fixing rear combination lamps to a vehicle;
    a plurality of lamp holders pivotally mounted to the fastener remover units for holding the rear combination lamps;
    guide rails formed on the base for guiding the sliding blocks; and
    an actuator in the base for actuating the sliding blocks.

6. An automatic rear combination lamp removal system comprising:
    a base;
    a plurality of sliding blocks slidably mounted on the base for moving four ways on the base;
    a plurality of fastener remover units mounted on the sliding blocks for removing nuts fixing rear combination lamps to a vehicle; and
    a plurality of lamp holders pivotally mounted to the fastener remover units for holding the rear combination lamps; and
    wherein each of the plurality of lamp holders has:
        a pair of arms pivotally connected to the remover body; and
        a pair of suction devices pivotally connected to the free end of each arm for holding the rear combination lamp.

* * * * *